(12) United States Patent
Snow

(10) Patent No.: US 9,159,185 B2
(45) Date of Patent: Oct. 13, 2015

(54) PHYSICAL PLAYING CARD GAMING SYSTEMS AND RELATED METHODS

(75) Inventor: Roger M. Snow, Las Vegas, NV (US)

(73) Assignee: Bally Gaming, Inc., Las Vegas, NV (US)

(*) Notice: Subject to any disclaimer, the term of this patent is extended or adjusted under 35 U.S.C. 154(b) by 208 days.

(21) Appl. No.: 13/598,239

(22) Filed: Aug. 29, 2012

(65) Prior Publication Data

US 2012/0319353 A1 Dec. 20, 2012

Related U.S. Application Data

(63) Continuation of application No. 12/572,205, filed on Oct. 1, 2009, now Pat. No. 8,342,529, which is a continuation-in-part of application No. 12/218,583, filed on Jul. 15, 2008, now Pat. No. 8,262,475.

(51) Int. Cl.
*A63F 13/00* (2014.01)
*G07F 17/32* (2006.01)

(52) U.S. Cl.
CPC .............. *G07F 17/32* (2013.01); *G07F 17/322* (2013.01); *G07F 17/3293* (2013.01)

(58) Field of Classification Search
USPC ........ 273/292; 463/10–13, 16–22, 25–28, 33, 463/37, 39–43, 47
See application file for complete search history.

(56) References Cited

U.S. PATENT DOCUMENTS

| | | | |
|---|---|---|---|
| 1,831,580 A | 11/1931 | Stecker | |
| 2,023,210 A | 12/1935 | Potter | |
| 2,666,645 A | 1/1954 | Phillips | |
| 3,222,071 A | 12/1965 | Lang | |
| 3,735,982 A | 5/1973 | Gerfin | |
| 3,810,627 A | 5/1974 | Levy | |
| 3,876,208 A | 4/1975 | Wachtler et al. | |
| 3,909,002 A | 9/1975 | Levy et al. | |
| 4,339,798 A | 7/1982 | Hedges et al. | |

(Continued)

FOREIGN PATENT DOCUMENTS

EP 1 814 091 8/2007
WO 0230529 4/2002

(Continued)

OTHER PUBLICATIONS

Brochure from TCS/John Huxley for Touch Table MultiPLAY™ Roulette, prior to 2007, 2 pages.

(Continued)

*Primary Examiner* — Sunit Pandya
(74) *Attorney, Agent, or Firm* — TraskBritt

(57) ABSTRACT

A physical playing card gaming system includes a gaming table including at least one dealer position and at least one player position. The system includes a physical playing card handling device that is configured to read at least one of a card rank and card suit of physical playing cards. The system also includes at least one processor in communication with the physical playing card handling device and a video monitor. The at least one processor is programmed to determine the composition of at least one dealer hand and at least one player hand based on the at least one of card rank and card suit read. The at least one processor is programmed to cause game information based on the determined hands to be displayed in response to dealer input. Methods of operating such a physical playing card gaming system include displaying the game information upon dealer request.

19 Claims, 5 Drawing Sheets

(56) References Cited

U.S. PATENT DOCUMENTS

| | | |
|---|---|---|
| 4,467,424 A | 8/1984 | Hedges et al. |
| 4,497,488 A | 2/1985 | Plevyak et al. |
| 4,531,187 A | 7/1985 | Uhland et al. |
| 4,534,562 A | 8/1985 | Cuff et al. |
| 4,614,342 A | 9/1986 | Takashima |
| 4,711,371 A | 12/1987 | Harrigan |
| 4,743,022 A | 5/1988 | Wood |
| 4,750,743 A | 6/1988 | Nicoletti |
| 4,755,941 A | 7/1988 | Bacchi |
| 4,760,527 A | 7/1988 | Sidley |
| 4,805,907 A | 2/1989 | Hagiwara |
| 4,813,675 A | 3/1989 | Greenwood et al. |
| 4,926,327 A | 5/1990 | Sidley |
| 4,948,134 A | 8/1990 | Suttle et al. |
| 5,022,653 A | 6/1991 | Suttle et al. |
| 5,033,744 A | 7/1991 | Bridgeman et al. |
| 5,067,713 A | 11/1991 | Soules et al. |
| 5,224,706 A | 7/1993 | Bridgeman et al. |
| 5,265,882 A | 11/1993 | Malek et al. |
| 5,277,424 A | 1/1994 | Wilms |
| 5,288,081 A | 2/1994 | Breeding et al. |
| 5,299,803 A | 4/1994 | Halaby et al. |
| 5,308,065 A | 5/1994 | Bridgeman et al. |
| 5,326,104 A | 7/1994 | Pease et al. |
| 5,328,189 A | 7/1994 | Malek et al. |
| 5,356,140 A | 10/1994 | Dabrowski et al. |
| 5,374,061 A | 12/1994 | Albrecht et al. |
| 5,395,120 A | 3/1995 | Malek et al. |
| 5,411,257 A | 5/1995 | Fulton et al. |
| 5,411,270 A | 5/1995 | Naka et al. |
| 5,437,451 A | 8/1995 | Fulton et al. |
| 5,437,462 A | 8/1995 | Breeding et al. |
| 5,586,766 A | 12/1996 | Forte et al. |
| 5,586,936 A | 12/1996 | Bennett et al. |
| 5,586,937 A | 12/1996 | Menashe |
| 5,591,081 A | 1/1997 | Suzuki |
| 5,605,334 A | 2/1997 | McCrea et al. |
| 5,669,817 A * | 9/1997 | Tarantino ................. 463/13 |
| 5,688,174 A | 11/1997 | Kennedy et al. |
| 5,707,287 A | 1/1998 | McCrea et al. |
| 5,722,893 A | 3/1998 | Hill et al. |
| 5,735,525 A | 4/1998 | McCrea et al. |
| 5,769,417 A | 6/1998 | Richer et al. |
| 5,770,533 A | 6/1998 | Franchi et al. |
| 5,779,546 A | 7/1998 | Meissner et al. |
| 5,803,809 A | 9/1998 | Yoseloff |
| 5,823,879 A | 10/1998 | Goldberg et al. |
| 5,863,041 A | 1/1999 | Boylan et al. |
| 5,863,042 A | 1/1999 | Lo et al. |
| 5,911,626 A | 6/1999 | McCrea et al. |
| 5,934,998 A | 8/1999 | Forte et al. |
| 5,941,769 A | 8/1999 | Order et al. |
| 5,975,528 A | 11/1999 | Halaby |
| 6,004,205 A | 12/1999 | Lauretta et al. |
| 6,039,650 A | 3/2000 | Hill et al. |
| 6,074,720 A | 6/2000 | Van Stratum |
| 6,093,103 A | 7/2000 | McCrea et al. |
| 6,117,012 A | 9/2000 | McCrea et al. |
| 6,165,069 A | 12/2000 | Sines et al. |
| 6,196,547 B1 | 3/2001 | Pascal et al. |
| 6,254,484 B1 | 7/2001 | McCrea, Jr. |
| 6,270,404 B2 | 8/2001 | Sines et al. |
| 6,293,864 B1 | 9/2001 | Romero |
| 6,299,536 B1 | 10/2001 | Hill |
| 6,319,122 B1 | 11/2001 | Packes, Jr. et al. |
| 6,343,989 B1 | 2/2002 | Wood et al. |
| 6,346,044 B1 | 2/2002 | McCrea, Jr. |
| 6,386,973 B1 * | 5/2002 | Yoseloff ................. 463/13 |
| 6,435,970 B1 | 8/2002 | Baerlocher et al. |
| 6,474,646 B1 | 11/2002 | Webb |
| 6,517,436 B2 | 2/2003 | Soltys et al. |
| 6,561,897 B1 | 5/2003 | Bourbour et al. |
| 6,565,432 B2 | 5/2003 | Moody |
| 6,575,831 B1 | 6/2003 | Gonen et al. |
| 6,582,301 B2 | 6/2003 | Hill |
| 6,626,757 B2 | 9/2003 | Oliveras |
| 6,651,985 B2 | 11/2003 | Sines et al. |
| 6,659,866 B2 | 12/2003 | Frost et al. |
| 6,666,765 B2 | 12/2003 | Vancura |
| 6,676,517 B2 | 1/2004 | Beavers |
| 6,688,597 B2 | 2/2004 | Jones |
| 6,722,974 B2 | 4/2004 | Sines et al. |
| 6,743,094 B2 * | 6/2004 | Johnson ................. 463/17 |
| 6,758,751 B2 | 7/2004 | Soltys et al. |
| 6,835,133 B2 | 12/2004 | Baerlocher et al. |
| 6,896,620 B1 | 5/2005 | Luciano et al. |
| 6,921,337 B1 | 7/2005 | Kennedy et al. |
| 6,939,224 B2 | 9/2005 | Palmer et al. |
| 7,008,324 B1 | 3/2006 | Johnson et al. |
| 7,048,629 B2 | 5/2006 | Sines et al. |
| 7,195,244 B1 | 3/2007 | Feola |
| 7,198,569 B2 | 4/2007 | Wolf et al. |
| 7,201,655 B2 | 4/2007 | Walker et al. |
| 7,201,661 B2 | 4/2007 | Kennedy et al. |
| 7,217,187 B2 | 5/2007 | Vancura |
| 7,255,351 B2 | 8/2007 | Yoseloff et al. |
| 7,255,642 B2 | 8/2007 | Sines et al. |
| 7,316,615 B2 | 1/2008 | Soltys et al. |
| 7,325,806 B1 | 2/2008 | Feola |
| 7,361,086 B2 | 4/2008 | Gazdic et al. |
| 7,367,563 B2 | 5/2008 | Yoseloff et al. |
| 7,374,170 B2 | 5/2008 | Grauzer et al. |
| 7,407,438 B2 | 8/2008 | Schubert et al. |
| 7,451,987 B1 | 11/2008 | Feola |
| 7,481,434 B1 | 1/2009 | Feola |
| 7,559,839 B2 | 7/2009 | Bahar |
| 7,775,887 B2 | 8/2010 | Kuhn et al. |
| 7,803,051 B2 | 9/2010 | Kuhn et al. |
| 7,878,892 B2 | 2/2011 | Sines et al. |
| 8,016,659 B2 | 9/2011 | Kuhn et al. |
| 8,251,802 B2 | 8/2012 | Snow |
| 2001/0000118 A1 | 4/2001 | Sines et al. |
| 2002/0002072 A1 | 1/2002 | Sines et al. |
| 2002/0022510 A1 | 2/2002 | Baerlocher et al. |
| 2002/0068635 A1 | 6/2002 | Hill |
| 2002/0077170 A1 * | 6/2002 | Johnson et al. ................. 463/16 |
| 2003/0003997 A1 | 1/2003 | Vuong et al. |
| 2004/0003395 A1 | 1/2004 | Srinivas et al. |
| 2004/0185933 A1 | 9/2004 | Nicely |
| 2004/0224777 A1 * | 11/2004 | Smith et al. ................. 463/47 |
| 2004/0229682 A1 | 11/2004 | Gelinotte |
| 2005/0012270 A1 * | 1/2005 | Schubert et al. ......... 273/149 R |
| 2005/0062226 A1 | 3/2005 | Schubert et al. |
| 2005/0164759 A1 | 7/2005 | Smith et al. |
| 2005/0242500 A1 | 11/2005 | Downs |
| 2005/0272501 A1 | 12/2005 | Tran et al. |
| 2006/0025213 A1 | 2/2006 | Kane et al. |
| 2006/0030400 A1 | 2/2006 | Mathis |
| 2006/0084505 A1 * | 4/2006 | Yoseloff et al. ................. 463/42 |
| 2006/0131809 A1 | 6/2006 | Lancaster et al. |
| 2006/0199629 A1 * | 9/2006 | Sines et al. ................. 463/12 |
| 2006/0217188 A1 | 9/2006 | Walker et al. |
| 2006/0226604 A1 | 10/2006 | Saucier |
| 2006/0234796 A1 | 10/2006 | Nobrega et al. |
| 2006/0279040 A1 | 12/2006 | Downs et al. |
| 2006/0281537 A1 | 12/2006 | Abbott et al. |
| 2007/0057469 A1 | 3/2007 | Grauzer et al. |
| 2007/0069462 A1 | 3/2007 | Downs et al. |
| 2007/0072682 A1 | 3/2007 | Crawford et al. |
| 2007/0205559 A1 | 9/2007 | Webb et al. |
| 2007/0238504 A1 | 10/2007 | Oliveras |
| 2007/0256111 A1 | 11/2007 | Medford et al. |
| 2007/0275762 A1 | 11/2007 | Aaltone et al. |
| 2008/0006996 A1 | 1/2008 | Frankel et al. |
| 2008/0006998 A1 | 1/2008 | Grauzer et al. |
| 2008/0037628 A1 | 2/2008 | Boyce et al. |
| 2008/0051171 A1 | 2/2008 | Lutnick et al. |
| 2008/0076500 A1 | 3/2008 | Lancaster et al. |
| 2008/0076506 A1 | 3/2008 | Nguyen et al. |
| 2008/0111300 A1 * | 5/2008 | Czyzewski et al. ....... 273/149 R |
| 2008/0113764 A1 | 5/2008 | Soltys |
| 2008/0113772 A1 | 5/2008 | Burrill et al. |
| 2008/0113783 A1 | 5/2008 | Czyzewski et al. |
| 2008/0119257 A1 | 5/2008 | Stern et al. |

(56) References Cited

U.S. PATENT DOCUMENTS

| | | |
|---|---|---|
| 2008/0176617 A1 | 7/2008 | Kekempanos et al. |
| 2008/0258388 A1 | 10/2008 | Schugar et al. |
| 2008/0268933 A1 | 10/2008 | Sines et al. |
| 2008/0268939 A1 | 10/2008 | Sines et al. |
| 2008/0268940 A1 | 10/2008 | Sines et al. |
| 2008/0303210 A1 | 12/2008 | Grauzer et al. |
| 2009/0017888 A1* | 1/2009 | Kuhn et al. .......... 463/13 |
| 2009/0054161 A1 | 2/2009 | Schubert et al. |
| 2009/0069090 A1 | 3/2009 | Moser et al. |
| 2009/0098932 A1 | 4/2009 | Longway |
| 2009/0115133 A1 | 5/2009 | Kelly et al. |
| 2009/0131151 A1 | 5/2009 | Harris et al. |
| 2009/0140492 A1 | 6/2009 | Yoseloff et al. |
| 2009/0191933 A1 | 7/2009 | French |
| 2009/0224476 A1 | 9/2009 | Grauzer et al. |
| 2009/0286585 A1 | 11/2009 | Walker |
| 2010/0016050 A1 | 1/2010 | Snow et al. |
| 2010/0062845 A1 | 3/2010 | Wadds et al. |
| 2011/0018195 A1 | 1/2011 | Downs, III et al. |
| 2011/0198805 A1 | 8/2011 | Downs, III et al. |

FOREIGN PATENT DOCUMENTS

| | | |
|---|---|---|
| WO | 2007/067213 | 6/2007 |
| WO | 2007/103351 | 9/2007 |
| WO | 2008/028148 | 3/2008 |
| WO | 2008/091809 | 7/2008 |
| WO | 2009/025673 | 2/2009 |

OTHER PUBLICATIONS

Dragon Bacc, brochure, pub. Feb. 16, 2007 (2 pgs); retrieved Feb. 4, 2010 from DigiDeal Corporation Web site: http://www.digideal.com/products/dragonbacc.php.

Extended European Search Report for corresponding EPO Application No. 101775484 dated Jan. 21, 2011; 8 pages.

International Search Report for PCT/US2009/050562 for Chipless Table Split Screen Feature, dated Sep. 1, 2009, 2 pages.

Nevada State Certificate of Registration for Trademark SAFEJACK to Mikohn Gaming Corporation of Las Vegas, Nevada dated Sep. 4, 1997.

Three (3) pictures taken of an Accuplay Table from TCS/John Huxley in use in an Arcade in Buylgaria, Feb. 2008.

* cited by examiner

PHYSICAL PLAYING CARD GAMING SYSTEMS AND RELATED METHODS

CROSS-REFERENCE TO RELATED APPLICATIONS

The present application is a continuation of U.S. patent application Ser. No. 12/572,205, filed Oct. 1, 2009, now U.S. Pat. No. 8,342,529, issued Jan. 1, 2013, which is a continuation-in-part of U.S. patent application Ser. No. 12/218,583, filed Jul. 15, 2008, titled "Chipless Table Split Screen Feature," which will issued as U.S. Pat. No. 8,262,475 on Sep. 11, 2012, the disclosure of each of which is hereby incorporated herein by this reference in its entirety. This application is also related to U.S. patent application Ser. No. 12/759,416, filed Apr. 13, 2010, which issued as U.S. Pat. No. 8,251,802 on Aug. 28, 2012.

TECHNICAL FIELD

The present invention relates to the field of automated or semi-automated casino table card games and systems, particularly systems supporting play of games where players have multiple hands and in which players have input into the setting of assigned cards between the multiple hands. The present invention further relates to a system and apparatus for automatically generating instructions on how to set hands.

BACKGROUND

There are many casino table card games disclosed in the patent literature that involve players being provided with multiple cards and the opportunity to distribute those cards into multiple hands (e.g., two, three, four or more hands). Some of these games are widely played in the gaming industry. Examples of these games include public domain pai gow poker, and a proprietary game called FORTUNE PAI GOW POKER®, which is described in U.S. Pat. No. 5,863,041.

These games involve play against a dealer hand, and the dealer hand is set according to predetermined casino rules, referred to in the art as the "house way." The term "house way" can include a variety of rules, such as when the dealer must take a hit card in the play of blackjack, the way the dealer must arrange a hand in the game of pai gow poker, and when a card must be discarded, etc. It is well known in the casino gaming industry that many games have house way rules that must be memorized by the dealer and followed to assure that the house maintains an edge in the game. In pai gow poker, the player must also follow one important house way rule. That is the rank of the low hand cannot exceed the rank of the high hand. Often, the dealer must assist the player in setting the hand the house way. It has proven very difficult to teach dealers house way rules and consequently hands (both dealer and player) are not correctly set, and the time it takes to set the hands is too long. The house way rules are generally determined by the casino. For example, in the game of blackjack, some casinos require the dealer to hit on a soft 17, while others require the dealer to stand on the same dealer hand.

Pai gow poker and its variants are not as profitable to casinos as compared with other games because the players must make complex decisions on how to set hands. They may request the dealer help in setting the hands. Anyone watching the play of pai gow poker will observe players setting and resetting their two required hands, and then rechecking the hands after they have been laid on the table. This type of strategic decision-making activity is one of the reasons that pai gow poker remains popular. Unfortunately, these decisions slow down the play of the game. This is particularly of concern to casinos as pai gow poker has one of the lower profit margins in casinos, as compared to many other games. Because of the slow play, combined with the low profit margin, the game of pai gow poker is not favored by casinos, even though it is very popular with customers.

Other games exist in the art that require hand setting. For example, a three-hand pai gow variant is described in Webb U.S. Pat. No. 6,474,646. In this game, players are required to set three hands to be played against a dealer's three hands (high, mid and low). U.S. Pat. No. 5,863,042 to Lo describes a poker game in which there is a primary wager and independent secondary wagers and player's set hands.

Schugar U.S. Patent Publication No. 2008/0258388 describes a wagering game that requires the dealer to discard cards according to a preset "house way."

Webb U.S. Patent Publication No. 2007/0205559 describes a wagering game in which the dealer sets and plays his hand according to predetermined house rules. The dealer then forms a dealer hand according to predetermined house way rules. The house way rules preferably require the dealer hand to stand under certain conditions.

In Saucier U.S. Patent Publication No. 2006/0226604, players place one or more wagers and opt whether to use a tiebreaker resolution. The banker may be required to set his or her hand according to a "house way" or "house rules."

Kane U.S. Patent Publication No. 2006/0025213 describes a system and method for playing a game of chance. In one example, a lottery game has a video poker secondary event. The poker game allows a player to arrange a plurality of virtual cards dealt to the player into a first hand and a second hand. Optionally, the player may select control 607 (e.g., a "HOUSE WAY" button) to arrange the cards into the first hand and the second hand according to the predefined set of rules.

All references cited herein are incorporated by reference in their entirety, especially with respect to descriptions of apparatus and systems, game rules and methods.

SUMMARY OF THE INVENTION

The present invention is a novel system for enabling play of a live casino card game. Systems of the present invention include a gaming table with a gaming surface, an automatic card shuffler capable of forming random sets of cards, and a "house way" indicator that provides the dealer, player or dealer and player important information on how to set each hand. The information may be made available automatically, or may be made available in response to a user input. The automatic card shuffler reads at least one of a rank and suit of each set of playing cards, so that sets of cards of known composition are delivered to the game. A processor is provided that contains house way hand-setting rules, receives set information and determines a house way to set the hand. This information is displayed to assist the dealer, player or dealer and player to set hands from the set of cards assigned to the player. The processor may be internal to the shuffler or external to the shuffler.

The automatic card shuffler is configured to deliver randomized sets of physical cards to a game position. A game position may be a player position, a dealer position, a common card position or other designated position on the layout. The shuffler is equipped with a playing card reading system that reads at least one of a rank and suit of markings on each of the playing cards. A processor receives the read card information from the playing card reading system and determines a composition of each individual set of playing cards dispensed.

The system includes a gaming table with a gaming surface and at least one video monitor on or proximate the gaming surface in communication with a processor programmed with house way rules for the particular game being controlled. The processor causes the display to display information on how to set hands from a distributed set of cards in a house way. The information can be in the form of card rank and/or suit information, images of one or more hands formed from the set, and data files representing cards that are to be placed into one or more hands.

The present invention is also characterized as a method of operating a casino table card game using physical playing cards that are distributed in sets to multiple play positions. The method comprises the step of providing a complete set of playing cards for use in the casino table card game. An example of a complete set for the game of pai gow poker is 52 standard cards plus one joker. The method includes at least one player making a game wager on the casino table card game. Randomized sets of cards are delivered to each player and to the dealer from the complete set. Some games may require that only players receive cards and, in that instance, randomized cards are only delivered to players. Other games may use only common cards and the set of cards would only then be delivered to the common card position.

The method includes reading rank, suit or rank and suit of playing cards in each set of cards with a reader to provide rank and suit information for each set. This card information is then communicated to the processor, and the processor determines the composition of each set of cards being dealt into the game from the read information. Sets of cards are then dealt to each play position. According to the method, the processor identifies each individual card in each individual set dealt to each play position. The processor is programmed with house way rules and determines a house way to set hands with cards from the set at each play position. Either automatically or upon player request, the processor sends data to be displayed as information on a monitor of the house way to set the hands. The player and/or the dealer then sets the hands according to the displayed information.

DETAILED DESCRIPTION OF THE INVENTION

Figure 1:
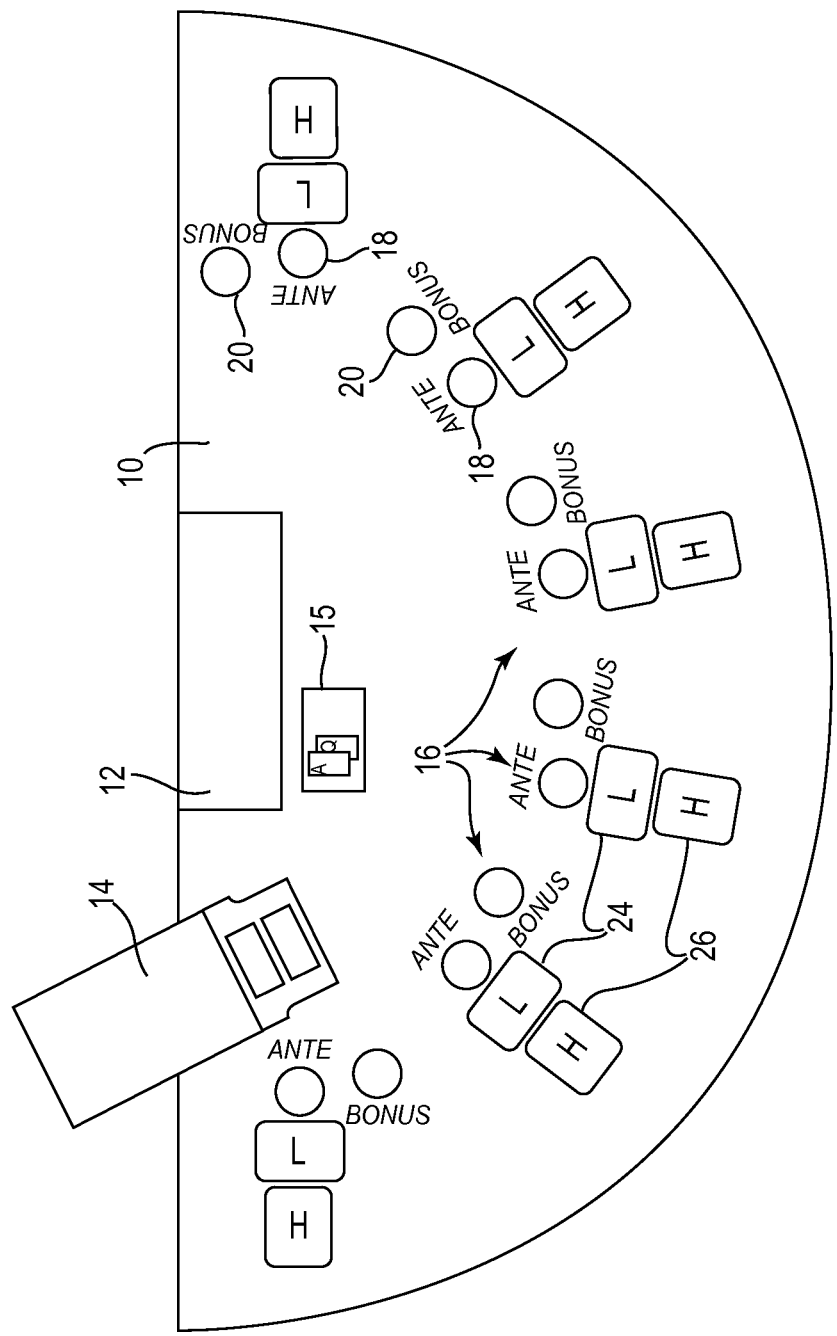
FIG. 1 is an exemplary system of the present invention, employing a gaming table, an automatic card shuffler and equipped with a "house way" display.

A system for enabling play of a casino table card game is disclosed that is particularly useful in games where players, a dealer or both players and dealers must set hands according to a complex set of house rules. According to the invention, card set composition is automatically determined, as well as the composition of a set of cards delivered to each play position. A play position for purposes of this invention is an area on the layout for a player, a dealer, a common area or other area designated for play purposes.

Preferably, multiple randomized sets of playing cards of known composition are formed and delivered to a game, and instructions for the dealer, player or dealer and player on how to set the hands the house way are provided on a display. Hands are set by following automatically generated and displayed house way instructions.

Systems of the present invention include an automatic card shuffler configured to deliver randomized sets of physical cards. The shuffler is equipped with a playing card reading system that reads at least one of a rank and suit of markings on each of the playing cards, wherein the automatic card shuffler has a processor that receives the read card information from the playing card reading system and determines a composition of each individual set of playing cards dispensed. The composition of each set is stored in the system's memory. One such shuffler is marketed under the brand name I-DEAL® and its structure and operation is disclosed in U.S. application Ser. No. 11/810,864, filed Jun. 6, 2007, now U.S. Pat. No. 8,070,574, issued Dec. 6, 2011, entitled "Apparatus, System, Method, and Computer-Readable Medium for Casino Card Handling," the content of which is incorporated by reference.

Systems of the present invention use a gaming table with a gaming surface, and provide at least one display such as a video monitor on or proximate the gaming surface. In one example of the invention, the display is a video monitor and the monitor is flush-mounted into the gaming surface of the gaming table. In other embodiments, the video monitor is mounted proximate the gaming table, such as on a pole that is supported by the table structure.

The display is in communication with a processor programmed with house way rules for displaying instructions on how to set hands from a distributed set of cards a house way. In some embodiments, the game rules are also programmed into the processor. The processor is preferably internal to the shuffler but, in other embodiments, is external to the shuffler. The display is capable of displaying information on how to set a hand according to programmed house way rules. In one embodiment, the "house way" information is displayed when the dealer inputs a command. In other embodiments, the information is automatically displayed.

To reduce the expense of systems of the present invention, it is desirable to provide a community display that can be used to set player hands, and when the game requires a dealer hand, to set the dealer hand. In systems that use community displays, it is preferable to provide a menu of options whereby the dealer can input the set of cards to be set. For example, if the dealer wants to set his own hand the house way, he would select the "dealer" set. If he then wanted to set the hand of the player in position 2, he would select "position 2" from the menu.

Once the set of cards is selected, the stored values that comprise this set of cards are retrieved from memory and the house way rules are applied to that set of values to determine how to set the hands. In the game of pai gow poker, for example, the players and dealer receive seven (7) cards each. The present system preferably identifies the two (2) cards that go into the low hand, and the remaining five (5) cards by default go into the high hand. In this instance, the two computer-selected card values are displayed, and then the dealer or player arranges the cards, as permitted by house rules.

In other embodiments, the display instead displays the five cards that are to be assigned to the high hand, and the two cards that are not displayed by default are assigned to the low hand. In yet other examples, the composition of both hands is displayed. When the game is pai gow poker, for example, the processor may be programmed to display a representation of a card of the suit and rank of each card in the two-card hand, five-card hand or both the two-card hand and five-card hand.

It is preferable to display a representation of a card to efficiently convey the infoiniation to the dealer and/or players. However, other forms of data may be displayed that can also convey the information. Examples include actual video images taken of all or part of the cards in the shuffler, or alphanumeric information of rank and/or suit values, for example.

In some embodiments, the house way rules reside in the shuffler processor. In other embodiments, the house way rules reside in an external processor. It is preferable to utilize the shuffler's processor to perform this function to avoid the cost of incorporating additional processing capability into the system, although other configurations are contemplated. The use of one or more processors in one or more locations to perform the disclosed functions is contemplated by the present invention. For example, the shuffler processor may control the executive functions of the shuffler and control the card reading system. The card reading output may then be input into a separate processor for determining how to set hands and, optionally, game outcome. In a preferred form of the invention, the shuffler function, card reading function, game rules, and house way rules are all managed by a single processor internal to the shuffler. The display may be equipped with some additional processing capability to control the appearance of the menu, and other button controls, for example.

In one preferred form of the invention, the display is equipped with touch screen controls or another conventional user input device programmed to require the dealer to input a request for setting a hand the house way. It is also preferable that the dealer first select the hand to be set from a menu of multiple available hands. For instance, the dealer could choose a dealer hand or any one of six player positions at a pai gow poker table. In response to a dealer input, the "house way" information is then displayed. Requiring the dealer to call for this information has advantages. First, it may be obvious to the dealer how to set the hand and asking for this information would cause an unnecessary delay in the game. Second, revealing the information on how to set the hand before the player has had a chance to think about his choices might discourage play. To maintain the ambiance of the game, the dealer needs to control the timing of the delivery of this important information.

Typically, the dealer would input a request for information on how to set the hand. However, in other embodiments that will be described in more detail below, the player is provided with controls for calling for the information. The information in this example could alternatively be displayed on a player display, rather than on a common display.

An automated system of controlling the play of a table game using live cards and electronic player wagering is described below that incorporates features of the present invention into a player display.

The present invention may also be characterized as a method of operating a casino table card game using physical playing cards that are distributed in sets to multiple play positions. Examples of play positions include player positions, a dealer position, a common card position or other designated position on a gaming table layout. The method includes the step of providing a complete set of playing cards for use in the casino table card game. The complete set may be a deck of cards, multiple decks of cards, special decks of cards or one or more decks with one or more extra cards such as a bonus card or a joker. When the method is used to operate a pai gow poker game, the preferred set of cards is a standard 52-card deck with one additional joker. The standard deck includes four suits (spades, diamonds, hearts and clubs), three court cards per suit (jack, queen, king) and an ace, 2, 3, 4, 5, 6, 7, 8, 9, and 10 of each suit.

According to the method, each player makes a game wager to participate in the casino table card game. When the game is pai gow poker, additional bets may be made available, such as bonus side bets, odds-based side bets and progressive side bets, with or without envy and/or bad beat bonuses.

After the wagers are in place, randomized sets of cards are delivered to each player and to the dealer from the complete set of cards. It is preferable that the randomized sets be formed internally in a hand-forming shuffler, capable of reading the rank and suit of the cards to determine the composition of the set of cards, and that is also capable of retaining set composition information within the shuffler. In other forms of the invention, the hands are formed manually after the shuffler or other card-handling device reads the rank and suit, but this method is less preferable because the dealer must input the set composition information into the shuffler or external computer in order to electronically store set information. It is also contemplated to use additional sensing devices on the table, such as an "end round" dealer input in order to provide a processor sufficient information to determine which cards that have been scanned should be assigned to each set. Clearly the most advantageous way to electronically gather set composition information is to scan the cards in a shuffler that securely shuffles and forms hands internally and produces a data file of set composition.

According to the method, the rank and suit of playing cards in each set of cards is read with a reader to provide rank and suit information for each set. This is preferably accomplished during shuffling, but could alternatively be accomplished by reading cards exiting a shoe, reading cards after cards have exited a shoe, reading cards as the cards are passed over a scanner or inserted into a "no-peek" type device, by overhead imaging and by other known methods.

Once the cards are scanned, the method includes the step of communicating the rank and suit information to a processor so that the processor can assemble set composition data. The sets of cards are preferably dealt to each player position (and other play positions as required by the rules of the game) after being scanned, but in alternative embodiments, cards are scanned at the player position after delivery.

The method includes the step of the processor identifying each individual card in each individual set dealt to each play position. This step may be accomplished by receiving the set composition data from the shuffler processor and storing this data in memory. The memory can reside in the shuffler or be memory associated with an external processor. The processor used to perform the method is programmed with house way rules and determining a house way to set hands with cards from the set at each play position. Either automatically or upon player request, the processor sends data to be displayed as information on a monitor of the house way to set the hands. An additional step of the present invention is for either the player, the dealer, or both the player and dealer, distributing cards from the set into the hands according to the displayed information.

When the method is practiced for administering the game of pai gow poker, a total of seven cards are delivered to each player and the dealer play positions. The dealer, the player, or the dealer and player refer to automatically displayed information that is used to set the hands. This displayed information advantageously speeds up game play by assisting the player and dealer in setting hands from the set of delivered cards without having to remember the house rules or without having to consult with another player or the dealer in setting the hand.

Figure 7:
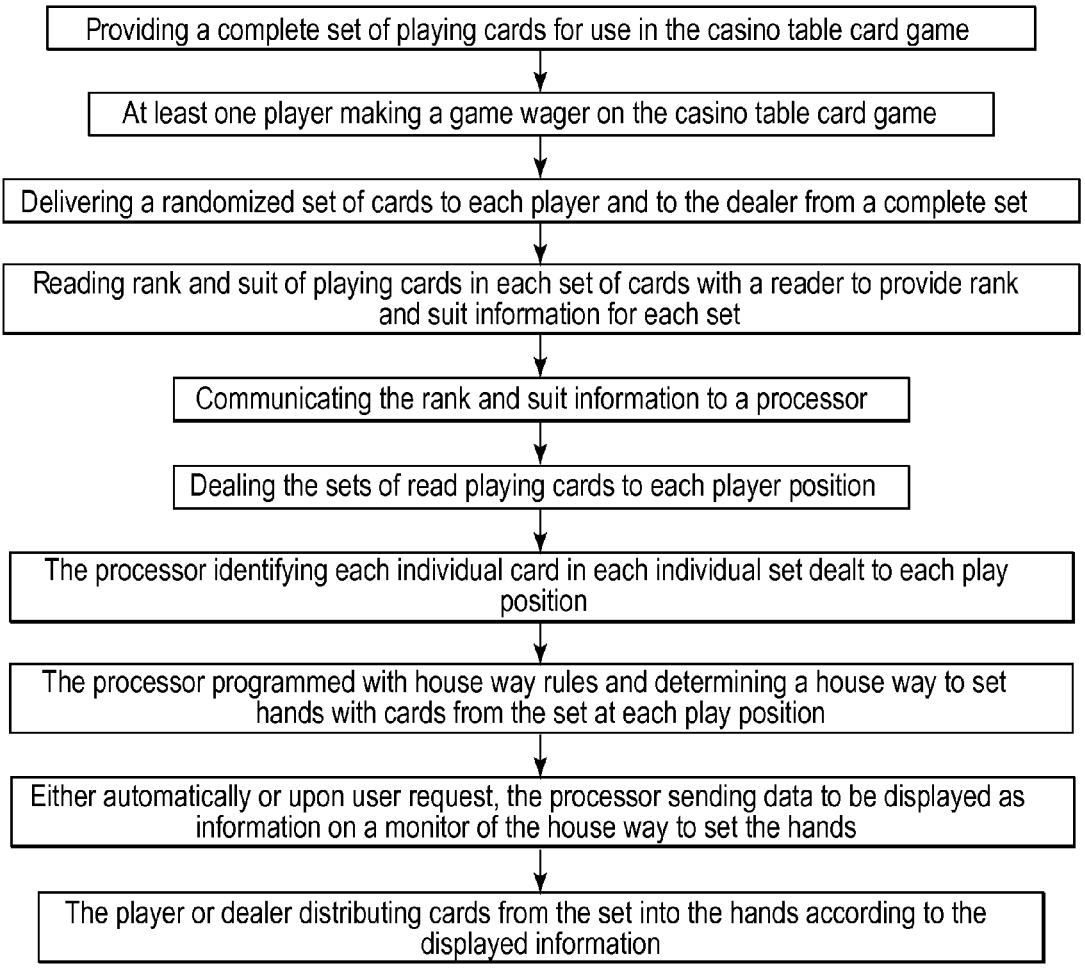
FIG. 7 is a flow diagram of a method according to technology disclosed herein.

House rules that relate to setting hands in pai gow poker vary from casino to casino. It is to be understood to those skilled in the art that known variations of house rules can be programmed and that all variants are contemplated by the present invention. The various steps described above of methods of the present invention are shown diagrammatically in FIG. 7.

The following information assembled in Table 1 provides an exemplary table of hand outcomes and relative rankings for the game of pai gow poker.

TABLE 1

The following five-card poker rankings are used to determine game outcome in the game of pai gow poker:

Rank of Hands

| | |
|---|---|
| 1. | Five Aces w/Joker |
| 2. | Royal Flush |
| 3. | Straight Flush |
| | A-2-3-4-5 is the second highest straight |
| | 9-10-J-Q-K is the third highest straight |
| 4. | Four of a Kind |
| 5. | Full House |
| 6. | Flush |
| 7. | Straight |
| | A-2-3-4-5 is the second highest straight |
| | 9-10-J-Q-K is the third highest straight |
| 8. | Three of a Kind |
| 9. | Two Pair |
| 10. | One Pair |
| 11. | High Card |

In addition, the ranking of the high hand must exceed the ranking of the low hand. Low hands are ranked by pairs, then by individual cards, with a pair of aces being the highest hand and a hand of a 2, 3 the lowest possible hand (a pair of twos would beat all high card hands).

TABLE II

The following table describes one exemplary set of "house way" hand setting rules for the game of pai gow poker:

| Dealer's Cards | 1st Rule | 2nd Rule | 3rd Rule | 4th Rule | 5th Rule |
|---|---|---|---|---|---|
| No Pair | Use highest ranked card in the high hand and the 2nd and 3rd highest rank cards in the low hand. | | | | |
| One Pair | Always use the pair in the high hand. | | | | |
| Two Pair | Definition of hands<br>Low pair: 2-5<br><br>Medium pair: 6-10<br>High pair: J-K<br>Ace: A | Always split aces and any other pair. | High-High: Always split<br>High-Med: Always split<br>High-Low: Always split unless an ace can be played in the low hand. | Med-Med: Always split unless an ace can be played in the low hand.<br><br>Med-Low: Always split unless an ace can be played in the low hand. | Low-Low: Always split |
| Three Pair | Always use the highest pair in the low hand. | | | | |
| Three of a Kind | Always use three of a kind in high hand except three aces, then split and use one ace in the low hand. | | | | |
| Two Three of a Kind | Always break the higher three of a kind to use in the low hand. | | | | |

TABLE II-continued

The following table describes one exemplary set of "house way" hand setting rules for the game of pai gow poker:

| Dealer's Cards | 1st Rule | 2nd Rule | 3rd Rule | 4th Rule | 5th Rule |
| --- | --- | --- | --- | --- | --- |
| Straight | Use the straight in the high hand. With a six-card straight, use the highest card in the low hand. | With one pair, use the pair in the low hand if the straight can be preserved. | Separate straight with: 1) Pair of J, Q, K and pair of 6 or higher. 2) Pair of aces and any other pair. 3) Two pair and ace using two pair in high hand (e.g.: A223345 = 22334-A5). | With three of a kind, play the pair in the low hand. | |
| Flush | Use the flush in the high hand. | Exception to rule 1: With a six-card flush, use the high card in the low hand. | Exception to rule 1: With a six-card flush and a pair, use the pair in the low hand. | Note: Choose straight over flush when A or K can be used in the low hand. | |
| Full House | Always split full house unless low pair is twos and hand contains A or K, then use full house in high hand. | | | | |
| Four of a Kind | Use four of a kind as high hand if it is sixes or lower. | Use four of a kind as high hand if it is sevens to tens unless an ace or a pair can be played in the low hand. | Always split jacks or higher. | With four of a kind and a pair, always play the pair in the low hand. | |
| Straight Flush | Use the straight flush in the high hand. | Exception to rule 1: With a six-card straight flush use the highest card in the low hand. | Exception to rule 1: With a six-card straight flush and a pair on either end, use the pair in the low hand. | Split straight flush with: 1) Pair of J, Q, K and pair of 6 or higher. 2) Pair of aces and any other pair. 3) Two pair and ace using two pair in low high hand (e.g.: A223345 = 22334-A5). | Played same as straight. |
| Royal Flush | Always play in high hand unless there are two pair of tens or higher then split. | | | | |
| Five Aces | Always split unless you have a pair of K then use KK in the low hand. | | | | |

Systems of the present invention enable game play using physical cards. In other embodiments, the systems are used in connection with play on multi-player gaming machines, single player gaming machines, wireless gaming platforms, Internet gaming, gaming on PCs for practice play and the like. The following examples describe how systems and methods of the present invention can be incorporated into gaming platforms that require the use of physical cards.

Example I

Apparatus used to practice the present invention is described below in several examples. As shown in FIG. 1, in this example of the invention, a gaming table 10 is provided with a substantially flat gaming surface. The gaming table 10 may be equipped with a standard chip tray 12, a hand-forming, card-reading shuffler 14, and a house way electronic display 15. On the gaming surface are printed markings designating player areas 16. Each player area 16 bears markings for placement of a low hand 24, placement of a high hand 26, the placement of an ante wager 18, and optionally the placement of a bonus wager 20. The shuffler 14 is computer controlled (not shown). The house way display 15 in this embodiment does not contain processing capability. In other embodiments, the house way display 15 is processor controlled, and the processor controls the touch screen controls, and the appearance of the data presented on the screen.

During play, players place an ante in region 20, and the dealer activates shuffler 14 to deliver pre-made, randomized sets of seven (7) cards each into the game. According to traditional dealing practice, six hands are delivered, regardless of how many players are participating in the game. The dealer inputs the player position via touch screen controls on the house way display 15 to activate the system to determine how that player's hand should be set. The display then displays the two cards that should be assigned to the low hand on the house way display 15. The player or the dealer, depending upon casino rules, places those cards in the low hand area 24. The remaining cards go into the high hand area 26.

This technology may be used for any type of game that requires the setting of hands from a set of cards. If, for example, the card game requires the player to set three hands from the set of cards, the house way display 15 would provide enough instructions to dictate how the hands should be set. For example, when the player sets three hands, the display must identify cards that go into at least two of the three hands. The remaining cards form the last hand.

The house way display 15 is preferably located in an area that is central to the gaming table surface, in view of all players. The dealer is the only person authorized to input commands or elections into the display. House rules dictate whether the dealer or the player must then set the cards according to the displayed information. In one embodiment, the player is required to set his own hand. The house way instruction may be followed or may be ignored. However, players will generally improve their chances of winning by following house way instructions.

Example II

In this next example, the present technology is incorporated into a gaming platform that enables card play using physical cards, but electronic wagering instead of wagering with currency or chips. Since each play position includes a display with a wagering interface and a touch screen input for making play decisions, this player display and input interface can also be used to request and receive house way hand setting information.

Figure 2:
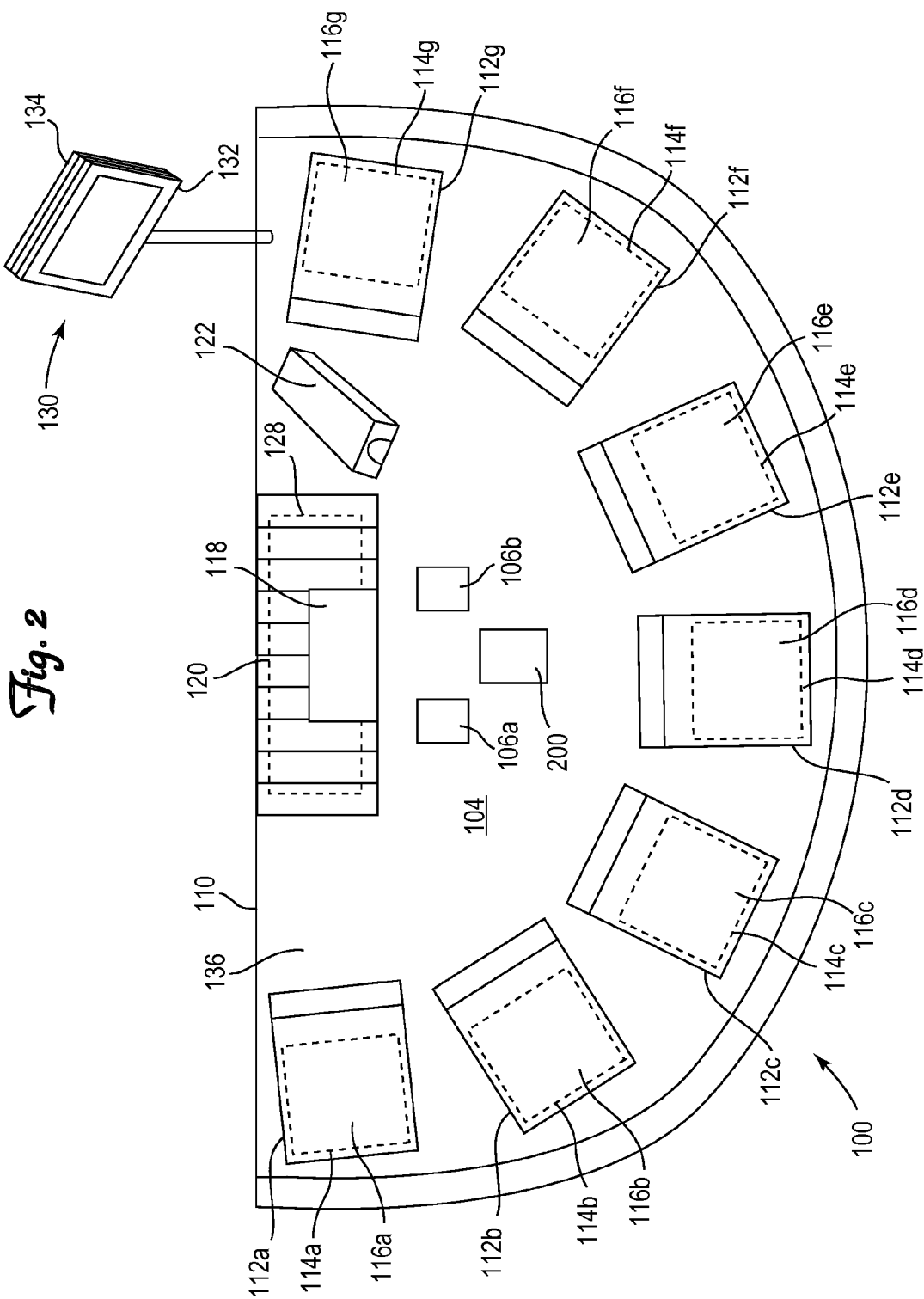
FIG. 2 is an exemplary electronic gaming platform, or chipless gaming table, according to one aspect of the invention.

In this example, as shown in FIG. 2, the gaming platform is an electronic, processor-based system, using physical playing cards, a card-handling device with card reading capability, and electronic player wagering interfaces. Such a system is more thoroughly described in U.S. application Ser. No. 12/218,583, filed Jul. 15, 2008, which is incorporated by reference herein. Each individual player position has a monitor on which information may be displayed. As cards are randomly assigned/distributed to each player position in a game in which the playing cards may be arranged into multiple hands in the same game, information may be provided to each player through the individual player monitors, on the "house way" of playing the hand. That is, the player is provided specific information on how all of the cards should be arranged in the manner selected by the house (the casino) to provide the highest potential for the play to follow ideal strategy. Players may use information that is automatically provided with each hand. In other embodiments, the information is not displayed until after the player inputs a request for the information and the player has the option to ask or not ask for the information. The player also has the option to use or not use the information in some embodiments.

A chipless gaming table 100 system is provided for playing live card games with physical playing cards (e.g., 106a and 106b) according to technologies enabled and disclosed herein. Gaming table 100 can be a variety of common constructions or configurations as are typically used as the structural components of gaming tables in the industry. The typical gaming table has a tabletop or playing surface 104 and a perimeter pad or armrest, which extends at least about the portion of a table periphery 110 facing the players. The relatively straight back portion of the periphery 110 is used by the dealer (not shown) and can be partly or wholly padded as may vary with the particular table chosen. Seven player display/input systems 112a-112g are shown. Each of the player input systems 112a-112g has a processor 114a-114g (shown in phantom) and a touch screen entry surface 116a-116g. There may be an optional dealer chip tray 120.

There is also a game controller, CPU or casino computer 128 (shown in phantom) whose location at the gaming table 100 system is relatively unimportant, but which must be in direct (hardwired, wireless or networked) communication with each individual player processor 114a-114g and a card reading and/or card delivery system 122, preferably a card-handling device such as a shoe or a shuffler with integrated card recognition technology, from which playing cards are supplied, with at least a rank/count (and preferably also suit) of individual cards known as the cards are removed (for example, one-at-a-time) and delivered to player positions and/or the dealer position. The card delivery system 122 shown in this example of the invention as a card-reading shoe, such as the shoe that is fully disclosed in U.S. patent application Ser. No. 12/291,909, filed Nov. 14, 2008, entitled "Card Reading Shoe with Card Stop Feature and Systems Utilizing the Same," the content of which is incorporated by reference. The card delivery system 122 is in communication with controller 128 by wired or wireless communication methods. Chipless gaming table 100 may further comprise a more centrally located display 200, which is also in communication with game controller 128 and preferably includes a random number generator. Display 200, or the house way display, may provide information to the player and dealer with instructions on how to set their hand according to house rules. In other embodiments, the individual player displays 112a-112g display house way information for players, and the community display 200 displays house way information for the dealer. The individual processors 114a-114g could also be in communication link with the game controller 128 by wireless or hardwired connections. Communication is not limited to electronic or electrical signals, but may include optical signals, audio signals, magnetic transmission or the like.

The playing surface 104 is provided on the gaming table 100 where participants of the card game(s) play. One or a plurality of players (not shown) sit or stand along the semi-circular portion and play a desired card game requiring the player, dealer, or both player and dealer to set hands. The gaming table 100 also advantageously includes a betting chip rack 120 that allows the dealer to conveniently store betting chips used by the dealer in cashing players in and out of the game. A money drop slot (not shown) is further included to allow the dealer to easily deposit paper money bills therein when players purchased credits.

Table 100 can support a system, or form a part of a system, for playing live card games that is constructed according to the present invention. The card game system 100 described herein, in one example, is a retrofit system that has been added to a standard gaming table support frame. Such a retrofit system includes an upright communal player display 130 that displays images that depict game information such as pay table, hand counts, win/loss information, historical win/loss information by player, and a wide variety of other information considered useful to the players. The display 130 is a two-sided display that will be explained more fully below.

The system also preferably includes a dealer control 118 that is preferably provided in the form of a display with touch screen controls positioned within the chip rack 120. In an alternative embodiment, the dealer control resides on the card-dispensing device 122 or as a separate keypad (not shown). The individual player position processors 114a-114g are preferably graphics processors and not full content CPUs as a cost saving, space saving, and efficiency benefit. With the reduced capacity in the processor as compared to a CPU, there is actually reduced likelihood of tampering and fraudulent input.

The "chipless table" format and architecture described herein comprises generic concepts and specific disclosure of components and subcomponents useful in the practice of the present technology. It should be appreciated at all times that equivalents, alternatives and additional components, functions and processes may be used within the system without deviating from the enabled and claimed technology of this invention.

One preferred construction of a chipless table has from three to eight players (table 100 shown in FIG. 2 with seven player positions) with five, six or seven player betting positions 112a-112g (with independent monitors 114a-114g) being preferred, a dealer console 118, a double-sided table sign (shown in FIG. 2 as 130, with a front player exposed screen 132 and a casino pit directed screen display 134), a card-reading shoe 122 (or card-reading shuffler or overhead camera imaging system or table-mounted card reader—not shown), a chip tray 120, cards 106a, 106b, a generic felt 136 and a table computer 128 using the AQUARIUS CONTROLLER™ protocol (game controller, under the table manufactured by Progressive Games, Inc. of Las Vegas, Nev.).

The game information (which is preferable for multiple games) is configurable and will be set up during the initial installation of the table and may be switched from game to game on-the-fly at each table. It is from the set-up that the game information is selected so that the graphics on the player touch screen 116a-116g are displayed. Dealer console 118, pit display 134 and screen 132 provide the correct information regarding the game in play. It is the capability of changing individual types of game events (e.g., from blackjack to pai gow poker) at a table that enables, or even requires, that the generic felt 136 is free of any permanent printing that identifies only a specific game at a table. There may be separate monitors (not shown) that enable display of game names, game rules and pay tables for individual games, or under table back-lighting that may project such information display on the table.

Using the pit display 134, the game is selected by casino personnel and communicated to the table controller 128 via a touch screen control on the pit display 134. The table controller (and/or a central pit controller) sends out the appropriate graphics to each of the player screens and table signs to begin game play.

An exemplary chipless table system is disclosed in U.S. patent application Ser. No. 12/218,583, filed Jul. 15, 2008 and U.S. patent application Ser. No. 12/231,759, filed Sep. 5, 2008, which are herein incorporated by reference in their entireties.

Figure 3:
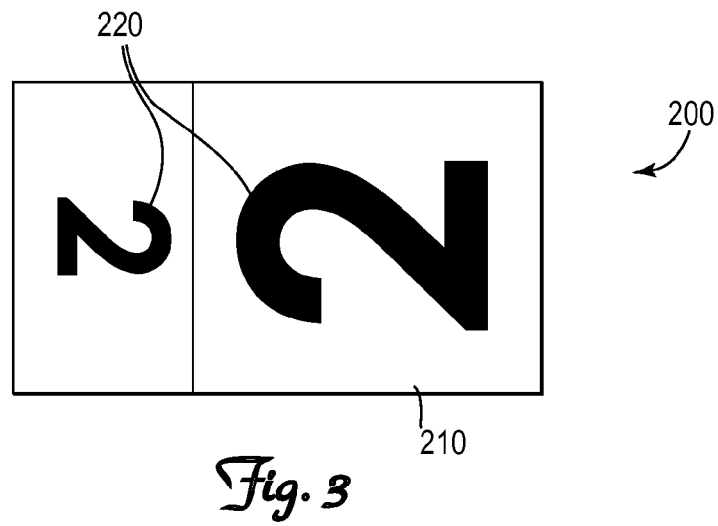
FIG. 3 is an exemplary screen layout that shows a randomly selected player starting position for delivering the first set of cards in a game of pai gow poker.

FIG. 3 shows an exemplary "house way" display screen, generally referred to as numeral 200. Preferably, display 200 is a touch screen display with a touch screen surface 210. When the game being played is pai gow poker, the display 200 may include a random number generator or receive a signal from game controller 128 or card-handling device 122 (FIG. 2), which also may provide randomly generated numbers. Alternatively, the information shown in display 200 may be incorporated into dealer console 118 (FIG. 2). The random number generator is used to identify the first player to receive a set of cards.

In this example, randomly selected number 220 is the number two. This instructs the dealer to begin dealing cards to the player seated in the number two player position 112b (FIG. 2), for games such as pai gow poker where there is no predetermined starting position. For ease of viewing by the player and the dealer, a large icon of randomly selected number 220 is oriented toward the player and a smaller icon is oriented in the direction of the dealer. The initial screen with randomly selected number 220 will remain displayed until a signal is received that cards have been delivered from card-handling device 122 (FIG. 2) to at least one player and the dealer.

Once cards are dealt to at least one player and the dealer, the "house way" display 200 changes to allow the dealer to input a decision showing which set of cards at the table to assign to or set into hands. The dealer makes the decision and inputs this decision into the touch screen controls by touching one of the areas one to six or DEALER area. This input causes the screen to change again as shown in FIG. 5 to show the elected set, and the card backs 260 of the two cards that have been selected by the processor to be assigned to the low hand.

Figure 4:
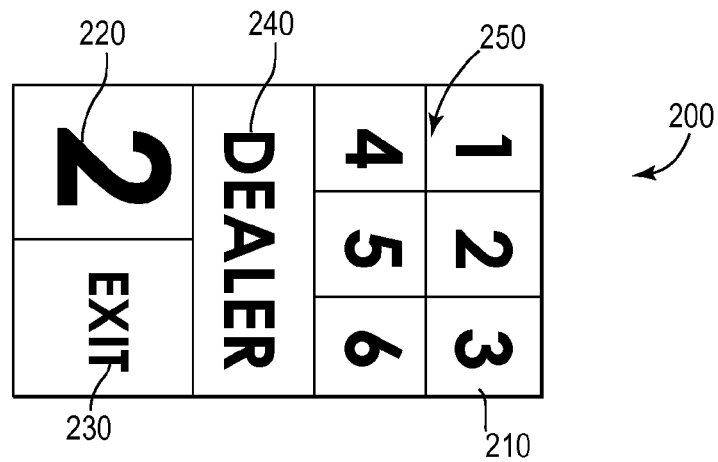
FIG. 4 is an exemplary screen layout that shows how to select the set of cards for purposes of obtaining house way hand-setting information.

In FIG. 4, the user may input a decision to elect which hand to set. Card-handling device 122 (FIG. 2) senses the rank and suit of the cards in the set prior to delivery.

The signal received by "house way" display 200 not only includes rank and suit of cards, but card set information for each set. At this point, the user has the option to select dealer button 240 or one of the player position buttons 250, in this example identified as numbers one through six, on touch screen surface 210. Exit button 230 is provided to return the user to the previous screen. While it is understood that the "buttons" on touch screen surface 210 are electronic likenesses thereof, mechanical buttons could also be used without deviating from the scope of the invention.

Figure 5:
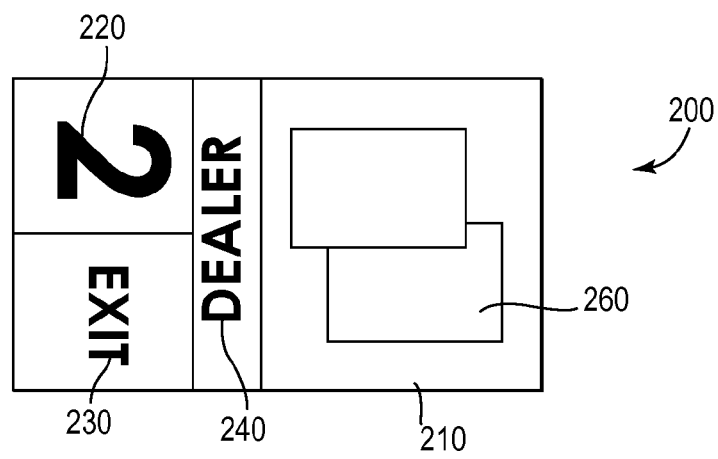
FIG. 5 is an exemplary screen layout that shows that the dealer hand has been selected, with the low hand cards displayed face down.

As shown in FIG. 5, the user has selected to display the house way of setting hands for the dealer hand by depressing dealer button 240 on touch screen surface 210 of display 200. This example illustrates setting a hand for pai gow poker, in which the players and the dealer each receive seven cards to form two hands. Two cards form the "low" hand and the remaining five cards form the "high" hand. Display 200 now shows an electronic representation of the two cards that form the dealer's low hand, with the card faces concealed, or face down 260. In this fashion, the casino ambience is preserved by not yet revealing the dealer hand and also gives the user an opportunity to exit back to the previous screen, via exit button 230, to select a player hand to display. In this example, only the low hand is displayed according to the house rules of setting a hand. By default, the remaining five cards comprise the high hand. In alternative embodiments, the high hand could be displayed, or both hands could be displayed.

Figure 6:
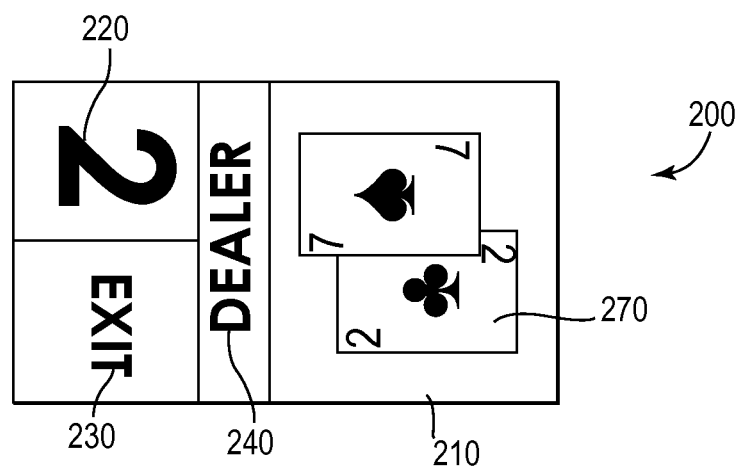
FIG. 6 is an exemplary screen layout that shows the dealer's low cards face up, indicating how to set the dealer hand according to the house way.

FIG. 6 shows the dealer's low hand, with cards face up 270, revealing the house way of setting the dealer's hand. While it is contemplated that the house way of setting hands is automatically calculated when the hand information is received by game controller 128 (see FIG. 2), the calculation could be delayed until the user manually depresses the appropriate buttons on touch screen surface 210 of display 200 if desired.

The house way display options shown in FIGS. 3-6 may be used on a live gaming table application as shown in Example I.

Gaming devices of the present invention utilize at least one processor, such as a microprocessor, a microcontroller-based platform, a suitable integrated circuit or one or more application-specific integrated circuits (ASICs) or Field Programmable Gate Arrays (FPGAs). The processor is in communication with or operable to access or to exchange signals with at least one data storage or memory device, the playing card delivery system and/or the individual player monitors. In one embodiment, the processor and the memory device reside within the cabinet of a gaming device dedicated to each table or networked to each one of multiple tables. The memory device stores program code and instructions, executable by the processor, to control the gaming device. The memory device also stores other data such as image data, event data, player input data, card set data, random or pseudo-random number generators, pay-table data, hand hierarchy, house way rules and applicable game rules that relate to the play of the gaming device.

In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes Flash memory and/or EEPROM (electrically erasable programmable read only memory). Any other suitable magnetic, optical, and/or semiconductor memory may operate in conjunction with the gaming device disclosed herein. In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network. In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example, part of a wireless gaming system.

In some embodiments, the gaming machine may be a handheld device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In some embodiments, the gaming device randomly generates a player position designation, or awards and/or other game outcomes based on probability data. In one such embodiment, this random determination is provided through utilization of a random number generator (RNG), such as a true random number generator, a pseudo random number generator, or other suitable randomization process. In one embodiment, each player position selection, award or other game outcome is associated with a probability and the gaming device generates the selection, award or other game outcome to be provided to the player based on the associated probabilities. In this embodiment, since the gaming device generates outcomes randomly or based upon one or more probability calculations, there is no certainty that the gaming device will ever provide the player with any specific selection, award or other game outcome. The use of physical playing cards read by the card delivery device, especially using randomized (shuffled) sets of cards to provide the playing cards in the card delivery device, reduces the use of RNGs in the performance of the process, as the randomization of the playing cards (even if in part effected through the use of RNGs in a shuffling device) reduces the immediacy of the use of RMGs in the operation of the present gaming system.

Although specific games, specific equipment, specific process steps and specific numbers have been used in providing an enabling description of the present technology, it must be understood that this disclosure is intended to be generic in nature and that the specifics provided are examples, not necessarily limits, on the scope of technology claimed herein.

What is claimed is:

1. A physical playing card gaming system, comprising:
   a gaming table including at least one dealer position and at least one player position;
   a physical playing card handling device associated with the gaming table and configured to read at least one of card rank and card suit of physical playing cards;
   a display associated with the gaming table; and
   at least one processor in communication with the physical playing card handling device and the display, the at least one processor programmed to determine composition of at least one of a dealer hand and at least one player hand based on the at least one of card rank and card suit read by the physical playing card handling device and programmed to cause at least one player instruction based on the at least one determined hand to be displayed on the display.

2. The system of claim 1, wherein the physical playing card handling device comprises a card shuffler.

3. The system of claim 1, wherein the physical playing card handling device comprises a card dispensing shoe.

4. The system of claim 1, wherein the at least one processor programmed to cause at least one player instruction based on the at least one determined hand to be displayed on the display comprises at least one processor programmed to cause the at least one player instruction based on at least one of game rules and the at least one determined hand to be displayed on the display.

5. The system of claim 1, wherein the at least one player instruction based on the at least one determined hand to be displayed on the display comprises an electronic wagering instruction.

6. The system of claim 1, wherein the at least one player instruction based on the at least one determined hand to be displayed on the display comprises a rank, suit, or rank and suit of at least some of the physical playing cards.

7. The system of claim 1, wherein the at least one processor programmed to cause at least one player instruction based on the at least one determined hand to be displayed on the display comprises at least one processor programmed to cause a house way of setting the determined hands to be displayed on the display.

8. The system of claim 1, wherein the at least one processor comprises a single processor.

9. The system of claim 1, wherein the at least one processor comprises at least one processor internal to the physical playing card handling device and at least one processor external to the physical playing card handling device.

10. The system of claim 1, wherein the display is flush mounted into a surface of the gaming table.

11. The system of claim 1, wherein the display is mounted on a pole proximate the gaming surface.

12. The system of claim 1, wherein the display is a common display positioned to be viewable by a dealer and players at the gaming table.

13. A method of operating a physical playing card gaming system, the method comprising:
providing a complete set of physical playing cards for use in the physical playing card gaming system to a physical playing card handling device at a gaming table, the gaming table including at least one player position and at least one dealer position;
reading the physical playing cards with the physical playing card handling device to determine card information;
communicating the card information to at least one processor;
delivering sets of physical playing cards from the physical playing card handling device to the at least one player position and the at least one dealer position;
identifying each card in each set of physical playing cards delivered to each of the at least one player position and the at least one dealer position with the at least one processor using the communicated card information;
determining at least one player instruction with the at least one processor using the identified each card in at least one set of physical playing cards delivered; and
displaying on a display the at least one player instruction.

14. The method of claim 13, wherein displaying on a display the at least one player instruction comprises displaying the at least one player instruction on a common display.

15. The method of claim 13, wherein providing a complete set of physical playing cards for use in the physical playing card gaming system to a physical playing card handling device comprises providing the complete set of physical playing cards to at least one of a shuffler and a shoe.

16. The method of claim 13, wherein determining at least one player instruction with the at least one processor comprises determining a house way of setting at least one of the sets of physical playing cards delivered.

17. The method of claim 16, wherein the at least one set of physical playing cards delivered comprises a dealer hand.

18. The method of claim 16, wherein the at least one set of physical playing cards delivered comprises a player hand.

19. The method of claim 16, wherein the at least one set of physical playing cards delivered comprises a dealer hand and at least one player hand.

* * * * *

UNITED STATES PATENT AND TRADEMARK OFFICE
CERTIFICATE OF CORRECTION

PATENT NO.        : 9,159,185 B2
APPLICATION NO.   : 13/598239
DATED             : October 13, 2015
INVENTOR(S)       : Roger M. Snow Page 1 of 1

It is certified that error appears in the above-identified patent and that said Letters Patent is hereby corrected as shown below:

In the specification:

| | | |
|---|---|---|
| COLUMN 1, | LINE 12, | change "which will issued as" to --which issued as-- |
| COLUMN 5, | LINE 12, | change "the infoiniation" to --the information-- |

Signed and Sealed this
Fifth Day of April, 2016

Michelle K. Lee
*Director of the United States Patent and Trademark Office*